(12) United States Patent
Watanabe et al.

(10) Patent No.: US 12,399,317 B2
(45) Date of Patent: Aug. 26, 2025

(54) OPTICAL FIBER BUNDLE STRUCTURE, OPTICAL FIBER CONNECTION STRUCTURE, AND OPTICAL FIBER BUNDLE STRUCTURE MANUFACTURING METHOD

(71) Applicant: FURUKAWA ELECTRIC CO., LTD., Tokyo (JP)

(72) Inventors: Kengo Watanabe, Tokyo (JP); Masanori Takahashi, Tokyo (JP); Ryuichi Sugizaki, Tokyo (JP); Koichi Maeda, Tokyo (JP); Shigehiro Takasaka, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 171 days.

(21) Appl. No.: 18/332,177

(22) Filed: Jun. 9, 2023

(65) Prior Publication Data

US 2023/0314700 A1    Oct. 5, 2023

Related U.S. Application Data

(63) Continuation of application No. PCT/JP2021/044038, filed on Dec. 1, 2021.

(30) Foreign Application Priority Data

Dec. 15, 2020    (JP) .................. 2020-207313

(51) Int. Cl.
*C03B 37/028*    (2006.01)
*G02B 6/02*    (2006.01)
(Continued)

(52) U.S. Cl.
CPC .............. *G02B 6/04* (2013.01); *C03B 37/028* (2013.01); *G02B 6/02042* (2013.01);
(Continued)

(58) Field of Classification Search
CPC .... C03B 37/028; G02B 6/02042; G02B 6/04; G02B 6/245; G02B 6/2552; G02B 6/44715
See application file for complete search history.

(56) References Cited

U.S. PATENT DOCUMENTS 5,408,556 A    4/1995    Wong
8,472,765 B2    6/2013    Holland et al.
(Continued)

FOREIGN PATENT DOCUMENTS

JP    2015-1673 A    1/2015
JP    5738275 B2    6/2015
(Continued)

OTHER PUBLICATIONS

Translation of Fujimaki et al. JP-2015152871-A filed Aug. 24, 2015 (Year: 2015).*

*Primary Examiner* — Ryan A Lepisto
(74) *Attorney, Agent, or Firm* — Oblon, McClelland, Maier & Neustadt, L.L.P.

(57) ABSTRACT

An optical fiber bundle structure includes: a plurality of optical fiber core wires; and a capillary, wherein each of the optical fiber core wires includes a glass fiber portion including a core and a clad, and a resin coated portion, the glass fiber portions are inserted in the capillary, and d2/d1 is equal to or larger than 0.57 and smaller than 1, where d1 is a diameter of the core of each of the glass fiber portions in a rear end portion of the capillary and d2 is a diameter of the core of each of the glass fiber portions in a distal end portion of the capillary.

13 Claims, 14 Drawing Sheets

(51) Int. Cl.
*G02B 6/04* (2006.01)
*G02B 6/245* (2006.01)
*G02B 6/255* (2006.01)
*G02B 6/44* (2006.01)

(52) U.S. Cl.
CPC ............ *G02B 6/245* (2013.01); *G02B 6/2552* (2013.01); *G02B 6/44715* (2023.05)

(56) References Cited

U.S. PATENT DOCUMENTS

| | | | |
|---|---|---|---|
| 9,069,116 B2 * | 6/2015 | Uemura | G02B 6/02004 |
| 2014/0369659 A1 | 12/2014 | Uemura et al. | |
| 2019/0219766 A1 * | 7/2019 | Watanabe | G02B 6/032 |
| 2020/0379168 A1 | 12/2020 | Mukasa | |

FOREIGN PATENT DOCUMENTS

| | | |
|---|---|---|
| JP | 2015-152871 A | 8/2015 |
| WO | WO 2018/062484 A1 | 4/2018 |
| WO | WO 2019/168054 A1 | 9/2019 |

\* cited by examiner

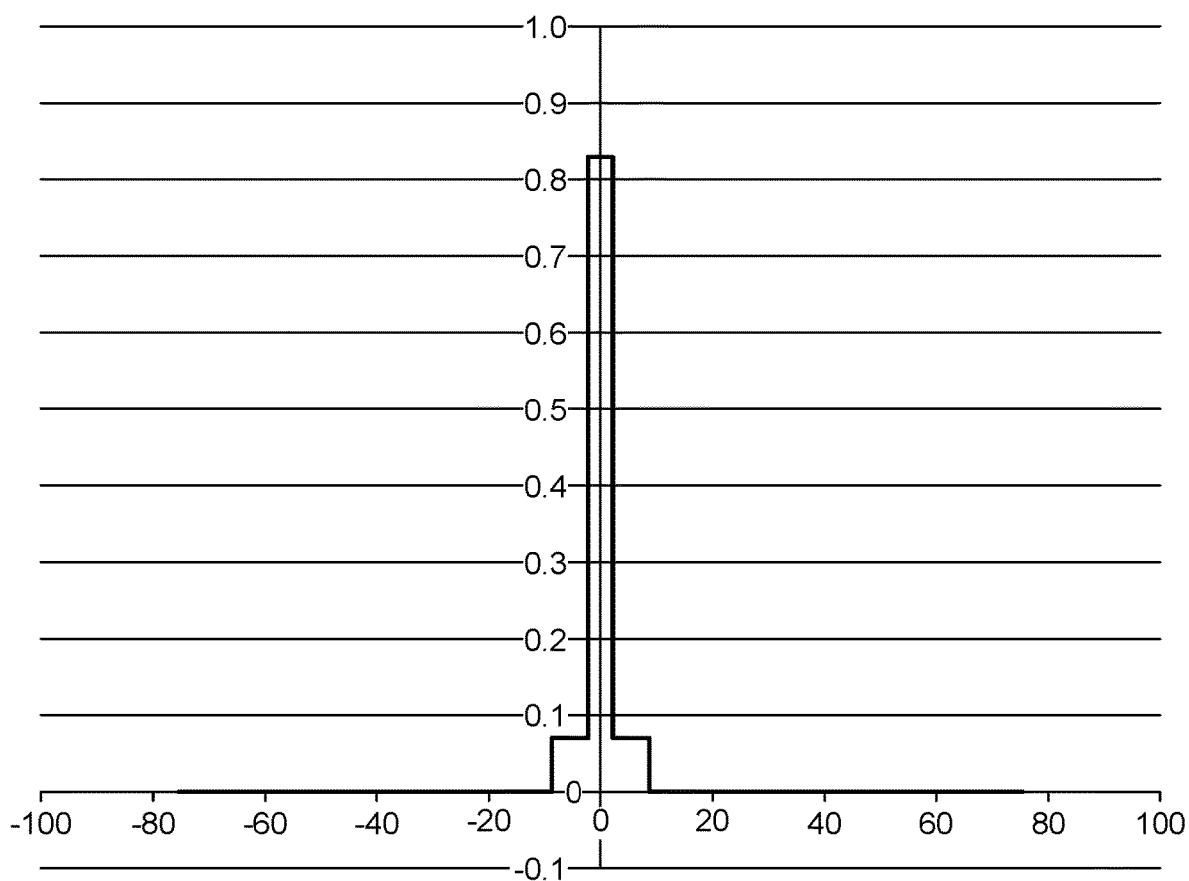

OPTICAL FIBER BUNDLE STRUCTURE, OPTICAL FIBER CONNECTION STRUCTURE, AND OPTICAL FIBER BUNDLE STRUCTURE MANUFACTURING METHOD

This application is a continuation of International Application No. PCT/JP2021/044038, filed on Dec. 1, 2021 which claims the benefit of priority of the prior Japanese Patent Application No. 2020-207313, filed on Dec. 15, 2020, the entire contents of which are incorporated herein by reference.

BACKGROUND

The present disclosure relates to an optical fiber bundle structure, an optical fiber connection structure, and an optical fiber bundle structure manufacturing method.

As an optical fiber bundle structure that connects single-mode optical fibers or few-mode optical fibers to a multi-mode optical fiber, an optical fiber bundle structure disclosed in Japanese Patent No. 5738275 is known. The optical fiber bundle structure disclosed in Japanese Patent No. 5738275 is formed by inserting a bundle of fibers that are arranged in a hexagonal shape such that cores of single-mode fibers or few-mode fibers become parallel to one another into a cladding tube and performing drawing such that the bundle of fibers and the cladding tube are tapered.

SUMMARY

The optical fiber bundle structure disclosed in Japanese Patent No. 5738275 is configured such that a taper rate that is obtained by dividing a first outer diameter of an input end by a second outer diameter of an output end is equal to or larger than 3 and equal to or smaller than 10. If drawing is performed such that the taper rate as described above is achieved, distances between the cores are reduced and crosstalk occurs. Therefore, this structure is not preferable as the optical fiber bundle structure for connecting single-mode optical fibers or few-mode optical fibers to core portions of a multicore fiber that is an optical fiber including a plurality of cores.

According to one aspect of the present disclosure, there is provided an optical fiber bundle structure including: a plurality of optical fiber core wires; and a capillary, wherein each of the optical fiber core wires includes a glass fiber portion including a core and a clad, and a resin coated portion, the glass fiber portions are inserted in the capillary, and d2/d1 is equal to or larger than 0.57 and smaller than 1, where d1 is a diameter of the core of each of the glass fiber portions in a rear end portion of the capillary and d2 is a diameter of the core of each of the glass fiber portions in a distal end portion of the capillary.

According to another aspect of the present disclosure, there is provided an optical fiber bundle structure manufacturing method including: inserting a glass fiber portion of an optical fiber core wire into a capillary, the optical fiber core wire including the glass fiver portion including a core and a clad and a resin coated portion; melting and drawing the capillary and the glass fiber portion inserted in the capillary such that d2/d1 is equal to or larger than 0.57 and smaller than 1, where d1 is a diameter of the core of the glass fiber portion in a rear end portion of the capillary and d2 is a diameter of the core of the glass fiber portion in a distal end portion of the capillary; and cutting a portion that is drawn by the melting and drawing such that a cross section crossing an axial direction of the capillary is exposed.

BRIEF DESCRIPTION OF THE DRAWINGS

FIG. 7 is a diagram illustrating a refractive index profile of the single mode optical fiber.

DETAILED DESCRIPTION

An embodiment of the present disclosure will be described in detail below with reference to the accompanying drawings. The present disclosure is not limited by the embodiment below. In addition, in the description of the drawings, the same or corresponding components are appropriately denoted by the same reference symbols. Further, it is necessary to note that the drawings are schematic, and dimensional relations among the components and the like may be different from the actual ones. Furthermore, the drawings may include portions that have different dimensional relations or ratios. Moreover, in the present specification, a cutoff wavelength or an effective cutoff wavelength indicates a cable cutoff wavelength that is defined in the International Telecommunication Union (ITU)-T G.650.1. Furthermore, other terms that are not specifically defined in the present specification conform to the definitions and the measurement methods described in ITU-T G.650.1 and G.650.2.

Figure 1:
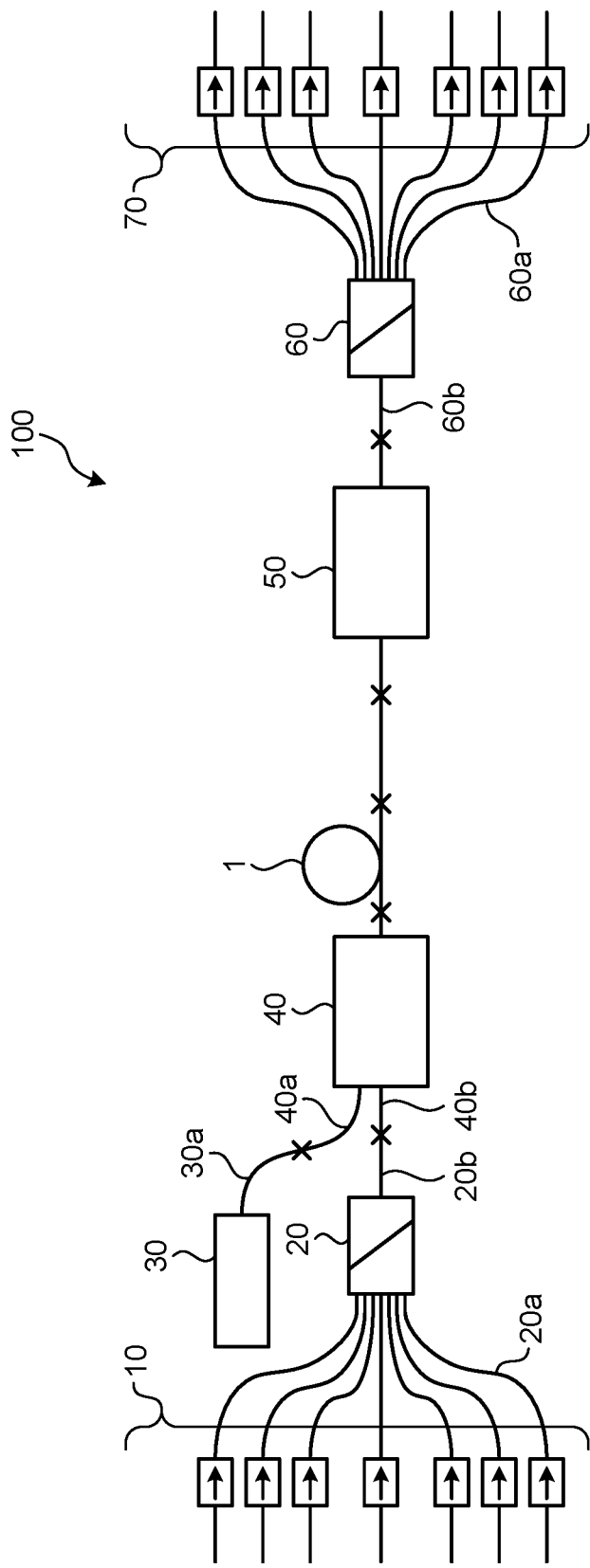
FIG. 1 is a schematic diagram illustrating a configuration of an optical amplifier according to an embodiment.

FIG. 1 is a schematic diagram illustrating a configuration of an optical fiber amplifier according to one embodiment of the present disclosure. In the following, a multi-core optical fiber amplifier may be simply described as an optical amplifier. An optical amplifier 100 includes seven optical isolators 10, an optical fiber fan-in (FAN IN) 20, a semiconductor laser 30, an optical coupler 40, a multi-core optical amplifying fiber 1, a pump stripper 50, an optical fiber fan-out (FAN OUT) 60, and seven optical isolators 70. Meanwhile, marks "x" in the drawing indicate fusion splice points of optical fibers.

The optical fiber fan-in 20 includes seven single mode optical fibers 20a that are bundled and a single multi-core fiber 20b that has seven core portions, and is configured such that each of core portions of the seven single mode optical fibers 20a is optically coupled with each of the core portions of the multi-core fiber 20b.

Each of the seven single mode optical fibers 20a is, for example, a standard single-mode optical fiber that is defined by ITU-TG.652, and includes the optical isolator 10. The optical isolators 10 allow light to pass in directions indicated by arrows, and block transmission of light in opposite directions.

The multi-core fiber 20b of the optical fiber fan-in 20 includes the seven core portions that are arranged in a triangular lattice manner and cladding portions that are located on outer peripheries of the respective core portions and that have lower refractive indices than maximum refractive indices of the respective core portions. When signal light is input to each of the single mode optical fibers 20a of the optical fiber fan-in 20, each of the optical isolators 10 transmits each signal light and each of the core portions of the multi-core fiber 20b propagates each signal light.

Meanwhile, a facet at which the seven single mode optical fibers 20a that are bundled and the multi-core fiber 20b are optically coupled with each other is machined so as to be inclined with respect to an optical axis to prevent reflection, but may be orthogonal to the optical axis. The multi-core fiber 20b of the optical fiber fan-in 20 is connected to the optical coupler 40.

The semiconductor laser 30 that is a pumping light source is a lateral multi-mode semiconductor laser and outputs pumping light. A wavelength of the pumping light is 976 nm that is approximately the same as a wavelength of an absorption peak in a wavelength band of 900 nm of Er. Therefore, the pumping light is able to optically excite an erbium ion. The semiconductor laser 30 outputs the pumping light from a multi-mode optical fiber 30a. The multi-mode optical fiber 30a is of a step-index type with a core diameter of 105 micrometers ($\mu$m) and a cladding diameter of 125 $\mu$m, and NA is set to, for example, 0.16 or 0.22.

The optical coupler 40 includes a main optical fiber 40b and an optical fiber 40a for supplying pumping light. The main optical fiber 40b is a double-clad optical fiber that includes seven core portions that are arranged in a triangular lattice manner (in other words, in a hexagonal close-packed manner) similarly to the core portions of the multi-core fiber 20b of the optical fiber fan-in 20, inner cladding portions that are located on outer peripheries of the respective core portions and that have lower refractive indices than maximum refractive indices of the respective core portions, and outer cladding portions that are located on outer peripheries of the inner cladding portions and that have lower refractive indices than the refractive indices of the inner cladding portions. The core portions and the inner cladding portions are made of silica based glass, and the outer cladding portions are made of resin.

The optical fiber 40a for supplying pumping light is the same kind of multi-mode optical fiber, one end of which is connected to the multi-mode optical fiber 30a of the semiconductor laser 30, which is of a step-index type with a core diameter of 105 $\mu$m and a cladding diameter of 125 $\mu$m, and which has NA of 0.16 or 0.22, for example. The optical fiber 40a for supplying pumping light receives input of pumping light from the semiconductor laser 30, and supplies the pumping light to the main optical fiber 40b. The inner cladding portion propagates the pumping light.

One end of the main optical fiber 40b of the optical coupler 40 is connected to the multi-core fiber 20b of the optical fiber fan-in 20. The main optical fiber 40b is a double-clad optical fiber that includes seven core portions that are arranged in a triangular lattice manner similarly to the core portions of the multi-core fiber 20b, inner cladding portions that surround the respective core portions and that have lower refractive indices than the core portions, and outer cladding portions that surround the inner cladding portions and that have lower refractive indices than the inner cladding portions. The core portions and the inner cladding portions are made of silica based glass, and the outer cladding portions are made of resin.

Each of the core portions of the multi-core fiber 20b is connected to each of the core portions of the main optical fiber 40b. Therefore, when each signal light that has propagated through each of the core portions of the multi-core fiber 20b enters the main optical fiber 40b, optical coupling with each of the core portions is achieved. Each of the core portions propagates each signal light. The pumping light and the signal light are output from the main optical fiber 40b to the multi-core optical amplifying fiber 1.

The multi-core optical amplifying fiber 1 is of a seven-core type that includes seven optical amplifying core portions that are arranged in a triangular lattice manner similarly to the main optical fiber 40b, inner cladding portions that are formed on outer peripheries of the optical amplifying core portions and that have lower refractive indices than the optical amplifying core portions, and outer cladding portions that are formed on outer peripheries of the inner cladding portions and that have lower refractive indices than the inner cladding portions. The multi-core optical amplifying fiber 1 is a well-known cladding-excitation type optical amplifying fiber that includes an erbium ion as an optical amplification medium in the optical amplifying core portions.

One end of the multi-core optical amplifying fiber 1 is connected to the main optical fiber 40b of the optical coupler 40. Each of the optical amplifying core portions of the multi-core optical amplifying fiber 1 is connected to each of the core portions of the main optical fiber 40b. Further, the inner cladding portions of the multi-core optical amplifying fiber 1 are connected to the inner cladding portions of the main optical fiber 40b. Therefore, each signal light and pumping light that have propagated through the main optical fiber 40b enters the multi-core optical amplifying fiber 1 and propagate through each of the optical amplifying core portions and the inner cladding portions in the same direction.

The pumping light optically excite an erbium ion in each of the optical amplifying core portions while propagating through the inner cladding portions. Each signal light that propagates through each of the optical amplifying core portions is optically amplified by the effect of stimulated emission of erbium. The multi-core optical amplifying fiber 1 outputs each signal light that is optically amplified and pumping light that has not contributed to optical amplification.

The pump stripper 50 is a well-known device that eliminates the pumping light that has not contributed to optical amplification. The pump stripper 50 is configured to, for example, remove portions of outer cladding portions of a double-clad multi-core fiber including seven cores, extract pumping light from surfaces of inner cladding portions of the eliminated portions such that the pumping light is applied to and absorbed by a heat sink, convert energy of the pumping light to thermal energy, and radiate heat. The pump stripper 50 allows each signal light to propagate by the multi-core fiber, and reduce power of the pumping light to the extent that the pumping light that is output from the optical amplifier 100 does not cause any problem.

The optical fiber fan-out 60 includes, similarly to the optical fiber fan-in 20, seven single mode optical fibers 60a that are bundled and a single multi-core fiber 60b that has seven core portions, and is configured such that each of core portions of the seven single mode optical fibers 60a is optically coupled with each of the core portions of the multi-core fiber 60b in a coupled portion (to be described later). The optical fiber fan-out 60 is one example of an optical fiber connection structure.

Each of the single mode optical fibers 60a allows light with a wavelength of 950 nm or more to propagate in a single mode or may allow light with a wavelength of 1260 nm or more to propagate in a single mode. The single mode optical fibers 60a as described above are one example of an optical fiber core wire that has a unimodal refractive index profile in which a relative refractive-index difference of a core portion with respect to a cladding portion is set to, for example, 0.35% so as to allow light in a predetermined wavelength bandwidth to propagate in a single mode. Each of the single mode optical fibers 60a as described above is a standard single mode optical fiber that are defined by, for example, ITU-TG.652. Each of the single mode optical fibers 60a includes the optical isolator 70.

The multi-core fiber 60b is connected to the pump stripper 50. Meanwhile, a facet at which the seven single mode optical fibers 60a that are bundled and the multi-core fiber 60b are optically coupled with each other is machined so as to be inclined with respect to an optical axis to prevent reflection, but may be orthogonal to the optical axis.

When signal light is input from each of the core portions of the multi-core fiber of the pump stripper 50 to each of the core portions of the multi-core fiber 60b of the optical fiber fan-out 60, each signal light propagates through each of the core portions of the single mode optical fibers 60a and is output through each of the optical isolators 70. The optical isolators 70 transmit light in directions indicated by arrows, and block transmission of light in opposite directions. Meanwhile, it may be possible to use an optical isolator in which a plurality of (seven in the present embodiment) single mode optical fibers are integrated, instead of the seven optical isolators 10 or 70.

Figure 2:
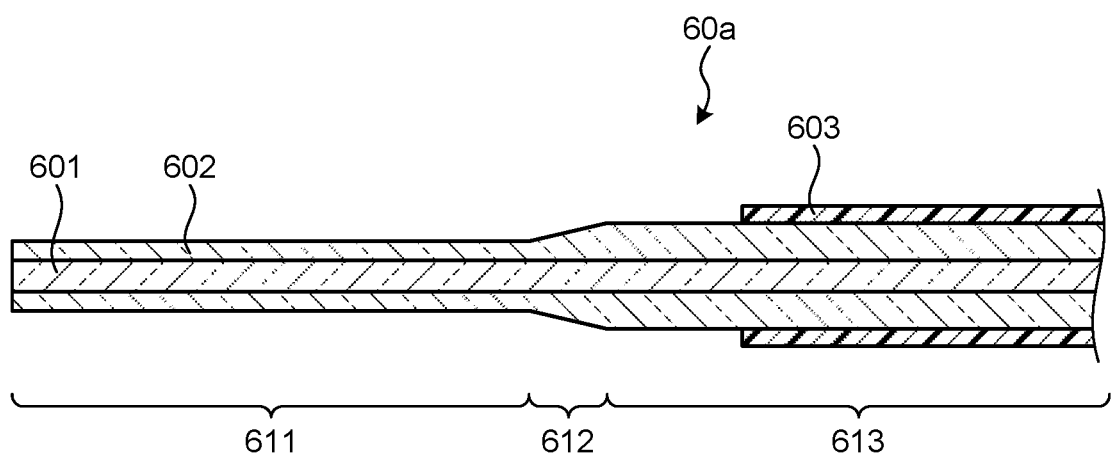
FIG. 2 is a cross-sectional view of a single mode optical fiber in an axial direction.

FIG. 2 is a schematic cross-sectional view of one of the single mode optical fibers 60a that is not yet bundled by the optical fiber fan-out 60, and is a cross section of the single mode optical fiber 60a in an axial direction. The single mode optical fiber 60a includes a core portion 601, a cladding portion 602 that is formed on an outer periphery of the core portion 601, and a coated portion 603 that is formed on an outer periphery of the cladding portion 602. the coated portion 603 is made of resin that is available for coating of an optical fiber. The single mode optical fiber 60a is one example of an optical fiber core wire. Further, the core portion 601 and the cladding portion 602 are examples of a glass fiber portion, and the coated portion 603 is one example of a resin coated portion.

Furthermore, the single mode optical fiber 60a is roughly divided into a small-diameter portion 611, a tapered portion 612, and a large-diameter portion 613 in the axial direction. The tapered portion 612 is a portion that is formed in a tapered manner in which the cladding portion 602 is subjected to etching such that an outer diameter of the cladding portion 602 is reduced from the large-diameter portion 613 to the small-diameter portion 611. The tapered portion 612 is one example of a diameter-reduced portion. The large-diameter portion 613 is a portion in which the cladding portion 602 is not subjected to etching and has a predetermined outer diameter. The outer diameter of the cladding portion 602 in the large-diameter portion 613 is set to, for example, 80 to 125 μm. The small-diameter portion 611 is a portion in which the cladding portion 602 is subjected to etching such that the outer diameter is reduced as compared to the cladding portion 602 in the large-diameter portion 613. The outer diameter of the cladding portion 602 in the small-diameter portion 611 is set to, for example, 45 μm or less. Further, an optical mode field dimeter of the single mode optical fiber 60a at a wavelength of 1550 nm is set to, for example, 7 μm.

Figure 3:
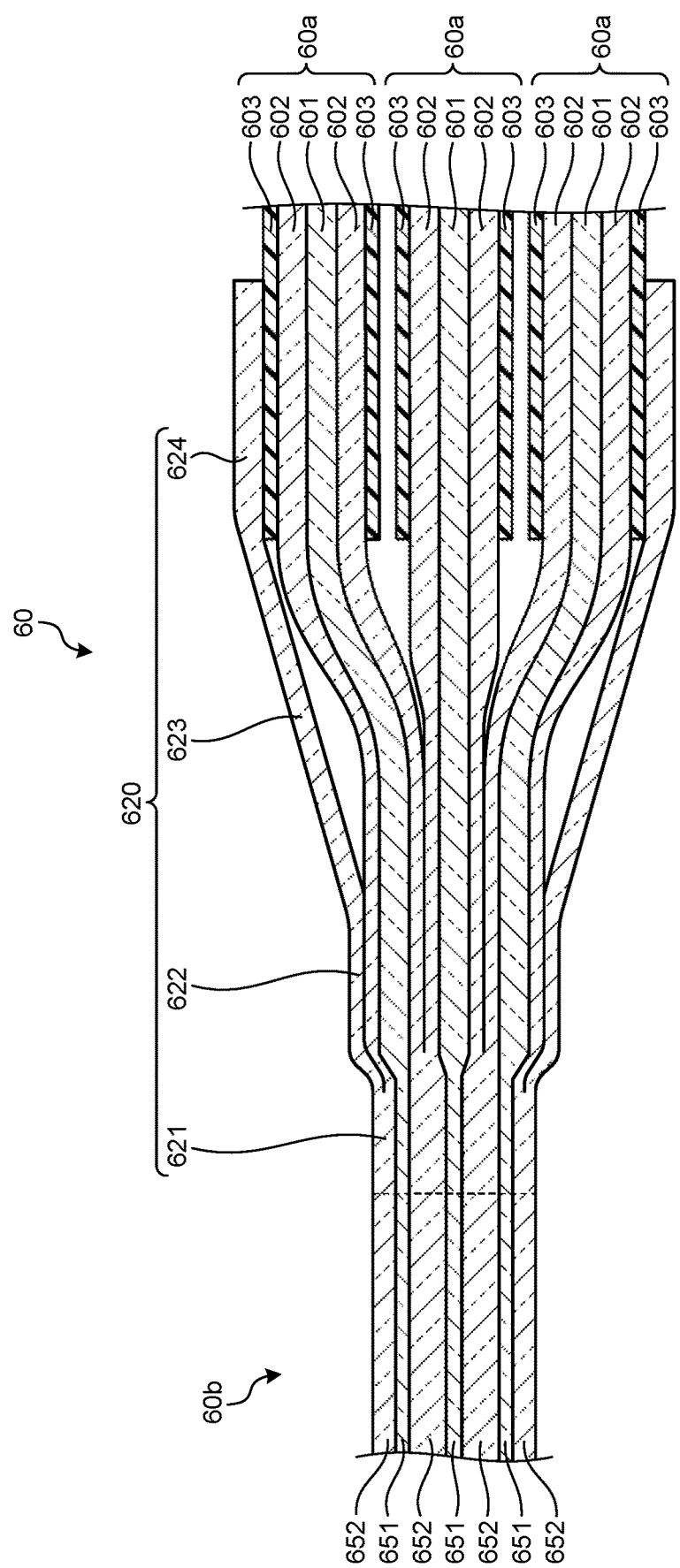
FIG. 3 is a cross-sectional view of an optical fiber fan-out in the axial direction.

FIG. 3 is a schematic cross-sectional view of the optical fiber fan-out 60 and illustrates a cross section of the optical fiber fan-out 60 in the axial direction. The optical fiber fan-out 60 includes the seven single mode optical fibers 60a, the multi-core fiber 60b, and a capillary 620 in which the seven single mode optical fibers 60a are inserted.

The multi-core fiber 60b includes seven core portions 651, and cladding portions 652 that are arranged on outer peripheries of the respective core portions 651 and that have lower refractive indices than maximum refractive indices of the respective core portions 651. The multi-core fiber 60b is configured such that, for example, an outer diameter of each of the cladding portions 652 is set to 135 μm, a core pitch is set to 38.5 μm, and an optical mode field diameter at a wavelength of 1550 nm is set to 7 μm. One end of the multi-core fiber 60b is connected to an optical fiber that propagates light that is output from the pump stripper 50.

The capillary 620 is made of, for example, quartz, and is roughly divided into a small-diameter portion 621, a medium-diameter portion 622, a tapered portion 623, and a large-diameter portion 624 in an axial direction.

The large-diameter portion 624 is a portion that has a largest inner diameter and a largest outer diameter, where the inner diameter is set such that the large-diameter portions 613 of the seven single mode optical fibers 60a may be inserted. The tapered portion 623 is formed in a tapered manner such that an inner diameter and an outer diameter are reduced from the large-diameter portion 624 to the medium-diameter portion 622. The tapered portions 612 of the inserted single mode optical fibers 60a are located in the tapered portion 623. The medium-diameter portion 622 is a portion which is located between the small-diameter portion 621 and the tapered portion 623 and in which the inner diameter and the outer diameter are reduced as compared to the large-diameter portion 624.

Figure 4:
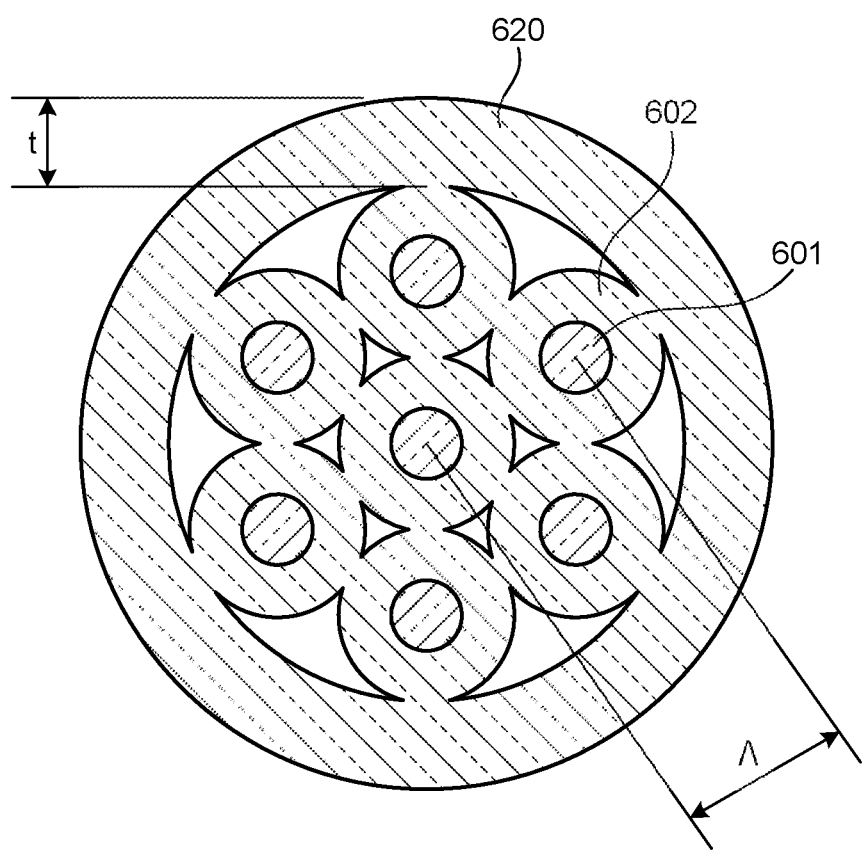
FIG. 4 is a cross-sectional view of a small-diameter portion of the optical fiber fan-out in a radial direction.

The small-diameter portion 621 is a portion in which the inner diameter and the outer diameter are reduced as compared to the medium-diameter portion 622. FIG. 4 is a cross-sectional view of the small-diameter portion 621 in a radial direction. The small-diameter portion 621 is formed by melting and drawing the small-diameter portions 611 of the single mode optical fibers 60a while the small-diameter portions 611 are arranged in a triangular lattice manner. By the melting and the drawing, in the small-diameter portion 621, the small-diameter portions 611 of the single mode optical fibers 60a are arranged and located in a triangular lattice manner, and at least the capillary 620 and the small-diameter portions 611 of the cladding portions 602 are fusion bonded together or the small-diameter portions 611 of the cladding portions 602 of the seven single mode optical fibers 60a are fusion bonded together.

In the optical fiber fan-out 60, each of the core portions 601 of the seven single mode optical fibers 60a is fusion bonded with each of the core portions 651 of the multi-core fiber 60b in an optically coupled manner. Further, in the optical fiber fan-out 60, the small-diameter portion 621 of the capillary 620 and each of the cladding portions 602 of the seven single mode optical fibers 60a are fusion bonded with the cladding portions 652 of the multi-core fiber 60b. A portion indicated by a dashed line in FIG. 3 in which the capillary 620 and the seven single mode optical fibers 60a are fusion bonded with the multi-core fiber 60b is one example of a coupled portion in which the seven core portions 601 and the core portions 651 are optically coupled with each other.

It is preferable that the outer diameter of the small-diameter portion 621 is not more than twice as large as the outer diameters of the cladding portions 652 of the multi-core fiber 60b, and it is preferable that the outer diameter of the small-diameter portion 621 is the same as the outer diameter of the multi-core fiber 60b from the viewpoint of ensuring the stability of fusion bonding with the multi-core fiber 60b and ensuring strength of a fusion point. Meanwhile, if a difference between the outer diameter of the small-diameter portion 621 and the outer diameter of the multi-core fiber 60b is increased, fusion bonding between the small-diameter portion 621 and the multi-core fiber 60b becomes unstable. Therefore, in the small-diameter portion 621, assuming that a distance between centers of the core portions 601 of the single mode optical fibers 60a that are arranged in a triangular lattice manner is denoted by $\Lambda$, it is preferable that a thickness of the small-diameter portion 621 of the capillary 620 is equal to or larger than 10 μm and $t \leq 2.5 \Lambda$. Meanwhile, it is preferable that t is equal to or larger than 10 μm and $t \leq 2.0 \Lambda$ if the four single mode optical fibers 60a are inserted in the capillary 620, and it is preferable that t is equal to or larger than 10 μm and $t \leq 3.1 \Lambda$ if the 19 single mode optical fibers 60a are inserted in the capillary 620. The reason why t is set to 10 μm or more is that if t is too small, the capillary 620 is deformed at the time of manufacturing, and it becomes difficult to maintain a circular cross section.

Furthermore, in the optical fiber fan-out 60, when it is assumed that a diameter of the core portion 601 of each of the single mode optical fibers 60a located in the large-diameter portion 624 that is a rear end portion of the capillary 620 is denoted by d1 and a diameter of the core portion 601 of each of the single mode optical fibers 60a located in the small-diameter portion 621 that is a distal end portion of the capillary 620 is denoted by d2, and if a value of d2/d1 is reduced, a waveguide mode becomes a leaky mode and crosstalk occurs between the cores. Therefore, it is preferable to set the value of d2/d1 to a certain value that does not cause the waveguide mode to become a leaky mode.

Figure 5A:
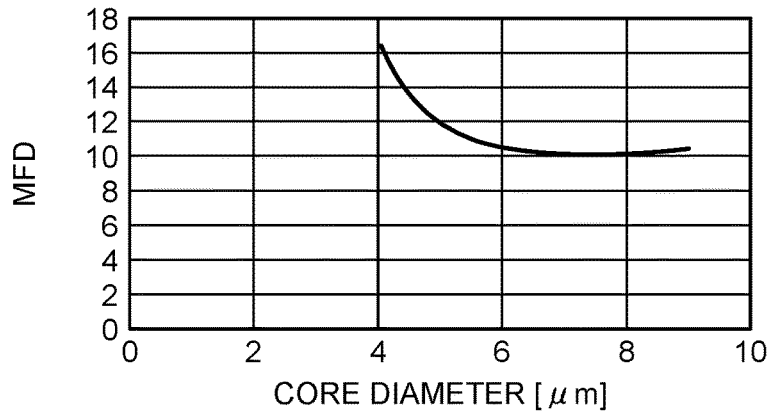
FIG. 5A is a diagram illustrating a simulation result of the single mode optical fiber.
Figure 5B:
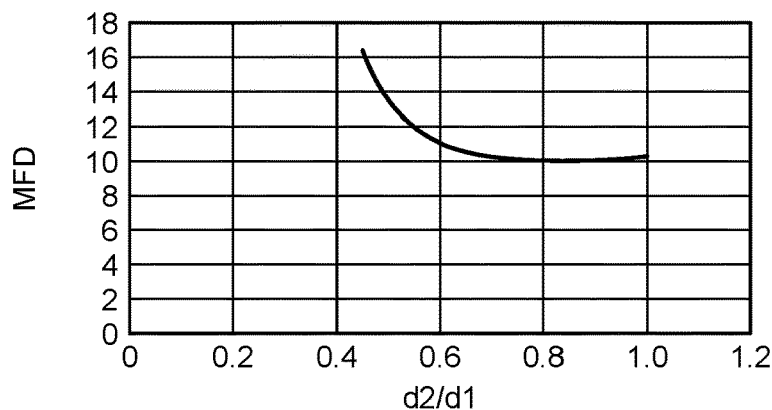
FIG. 5B is a diagram illustrating a simulation result of the single mode optical fiber.
Figure 5C:
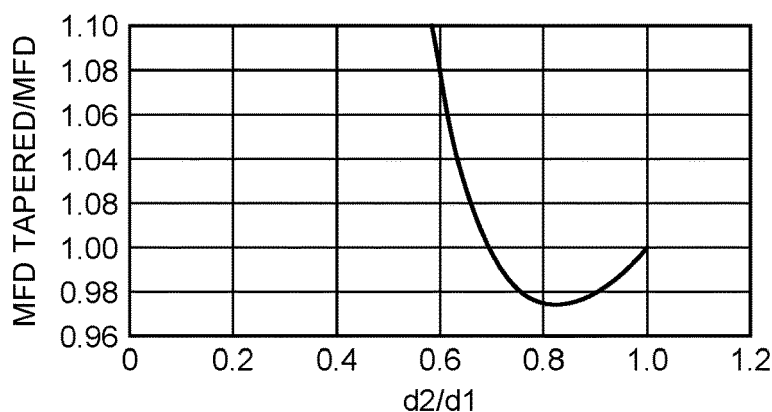
FIG. 5C is a diagram illustrating a simulation result of the single mode optical fiber.

FIG. 5A is a graph that represents a simulation result of a relationship between a mode field diameter (MFD) at a wavelength of 1550 nm and the diameter of the core portion 601 in a case where each of the single mode optical fibers 60a is a single-mode fiber having a unimodal refractive index profile in which the cable cutoff wavelength is 1267 nm and the relative refractive-index difference $\Delta$ is 0.35%. Meanwhile, for convenience of explanation, the single mode optical fiber 60a with this configuration will be referred to as a fiber A. FIG. 5B is a graph that represents a relationship between the mode field diameter (MFD) and d2/d1 of the fiber A, and FIG. 5C is a graph that represents a relationship between a standardized mode field diameter (MFD) and d2/d1 of the fiber A.

In the present embodiment, a region in which the standardized mode field diameter exceeds 1 is defined as a region in which the waveguide mode becomes a leaky mode. Therefore, according to the graph in FIG. 5C, the standardized mode field diameter exceeds 1 when d2/d1 becomes equal to or smaller than 0.69, and therefore, as for the fiber A, it is preferable that 0.69<d2/d1<1. The core diameter is 9 μm and the mode field diameter is 10.3 μm when d2/d1=1, and the core diameter is 6.2 μm when d2/d1=0.69.

Figure 6A:
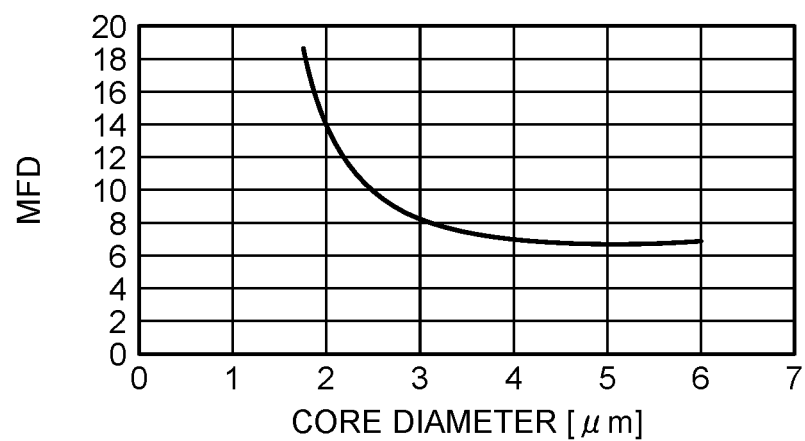
FIG. 6A is a diagram illustrating a simulation result of the single mode optical fiber.
Figure 6B:
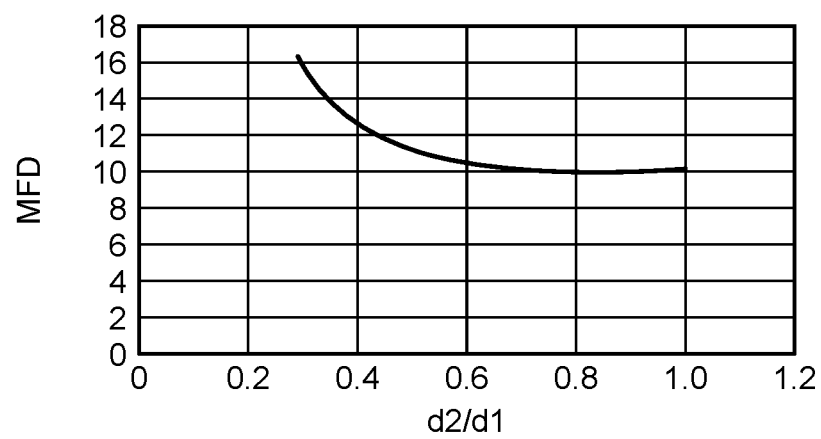
FIG. 6B is a diagram illustrating a simulation result of the single mode optical fiber.
Figure 6C:
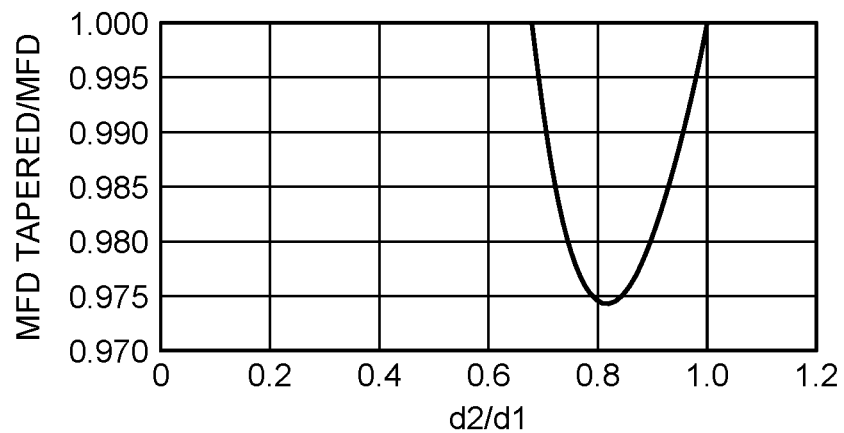
FIG. 6C is a diagram illustrating a simulation result of the single mode optical fiber.
Figure 6D:
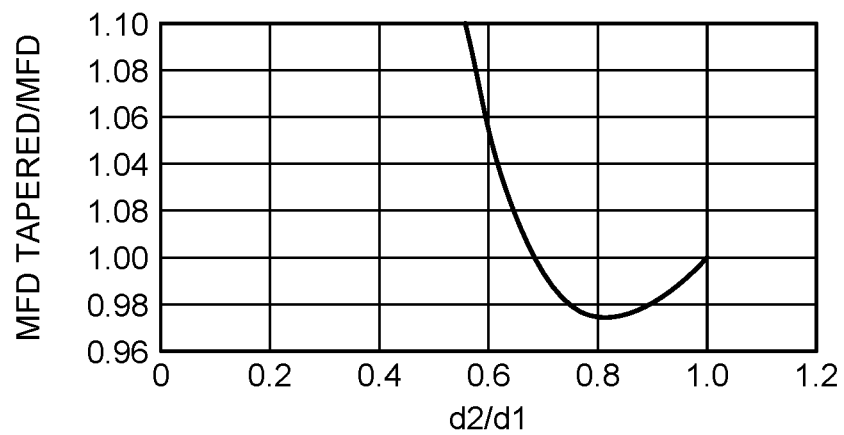
FIG. 6D is a diagram illustrating a simulation result of the single mode optical fiber.

FIG. 6A is a graph that represents a simulation result of a relationship between a mode field diameter (MFD) at a wavelength of 1550 nm and the diameter of the core portion 601 in a case where each of the single mode optical fibers 60a is drawn such that the cable cutoff wavelength is 1507 nm and is formed as a dispersion shifted fiber (DSF) having a stepped refractive index profile as one example of a unimodal refractive index profile as illustrated in FIG. 7 in which a relative refractive-index difference $\Delta$ is 0.83%. Meanwhile, for convenience of explanation, the single mode optical fiber 60a with this configuration will be referred to as a fiber B. FIG. 6B is a graph that represents a relationship between the mode field diameter (MFD) and d2/d1 of the fiber B, and FIG. 6C and FIG. 6D are graphs that represent relationships between a standardized mode field diameter (MFD) and d2/d1 of the fiber B. According to the graphs in FIG. 6C and FIG. 6D, the standardized mode field diameter exceeds 1 when d2/d1 becomes equal to or smaller than 0.68, and therefore, as for the fiber B, it is preferable that 0.68<d2/d1<1. The core diameter is 6 μm and the mode field diameter is 7 μm when d2/d1=1, and the core diameter is 4.0 μm when d2/d1=0.68.

Figure 8A:
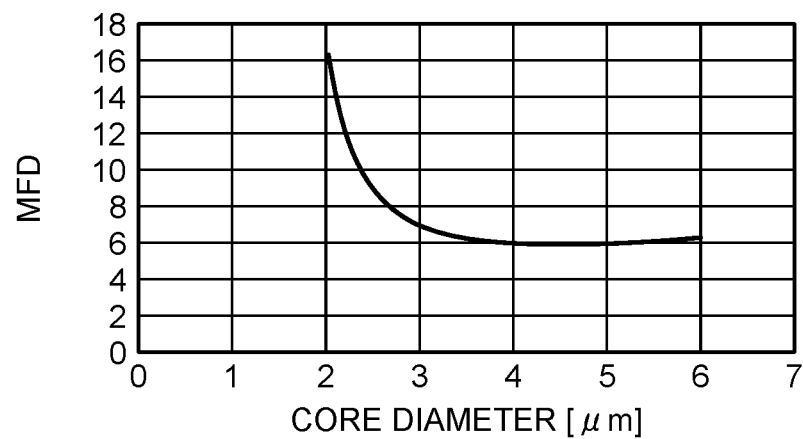
FIG. 8A is a diagram illustrating a simulation result of the single mode optical fiber.
Figure 8B:
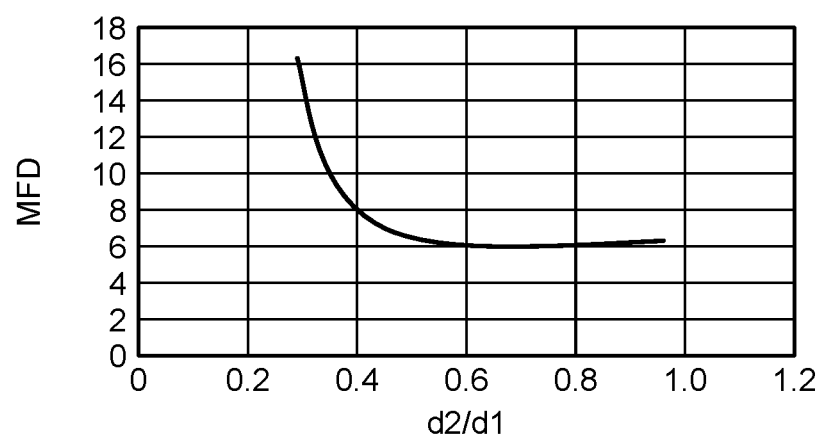
FIG. 8B is a diagram illustrating a simulation result of the single mode optical fiber.
Figure 8C:
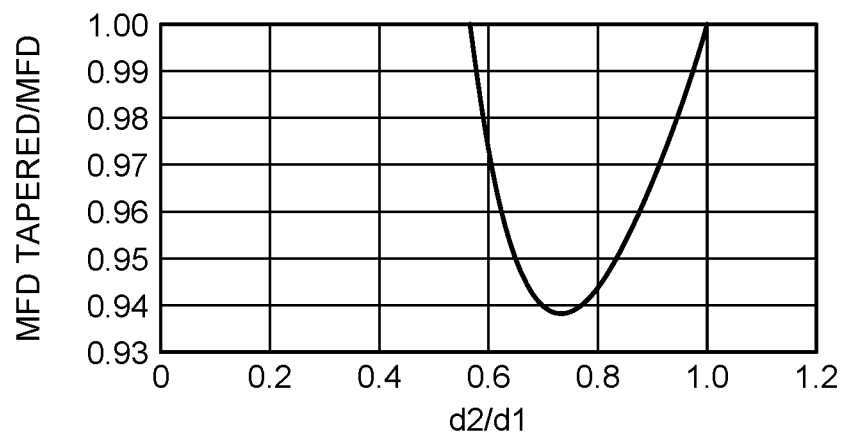
FIG. 8C is a diagram illustrating a simulation result of the single mode optical fiber.
Figure 8D:
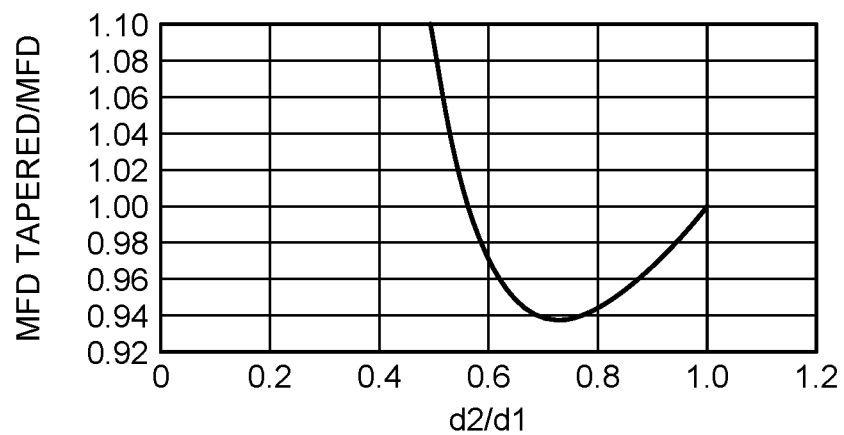
FIG. 8D is a diagram illustrating a simulation result of the single mode optical fiber.

FIG. 8A is a graph that represents a simulation result of a relationship between a mode field diameter (MFD) at a wavelength of 1550 nm and the diameter of the core portion 601 in a case where each of the single mode optical fibers 60a is drawn such that the cable cutoff wavelength is 1497 nm and is formed as a single-mode fiber having a unimodal refractive index profile in which a relative refractive-index difference $\Delta$ is 1%. Meanwhile, for convenience of explanation, the single mode optical fiber 60a with this configuration will be referred to as a fiber C. FIG. 8B is a graph that represents a relationship between the mode field diameter (MFD) and d2/d1 of the fiber C, and FIG. 8C and FIG. 8D are graphs that represent relationships between a standardized mode field diameter (MFD) and d2/d1 of the fiber C. According to the graphs in FIG. 8C and FIG. 8D, the standardized mode field diameter exceeds 1 when d2/d1 becomes smaller than 0.57, and therefore, as for the fiber C, it is preferable that 0.57 d2/d1<1. The core diameter is 6 μm and the mode field diameter is 7 µm when d2/d1=1, and the core diameter is 4.4 µm when d2/d1=0.57.

Figure 9A:
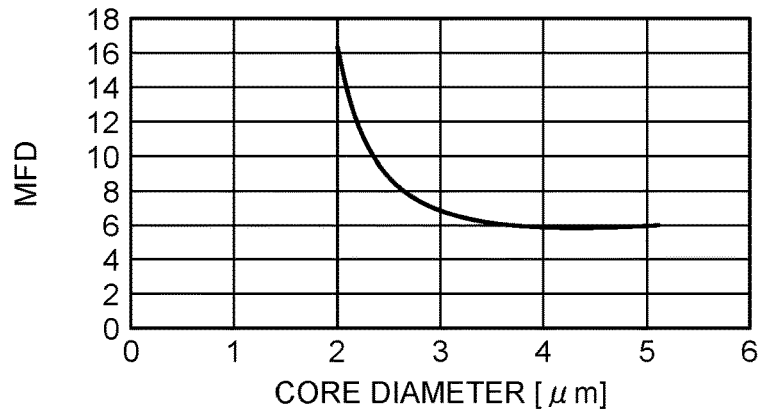
FIG. 9A is a diagram illustrating a simulation result of the single mode optical fiber.
Figure 9B:
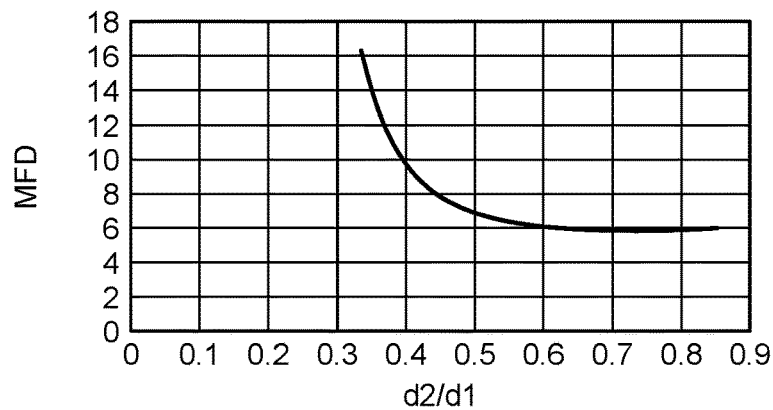
FIG. 9B is a diagram illustrating a simulation result of the single mode optical fiber.
Figure 9C:
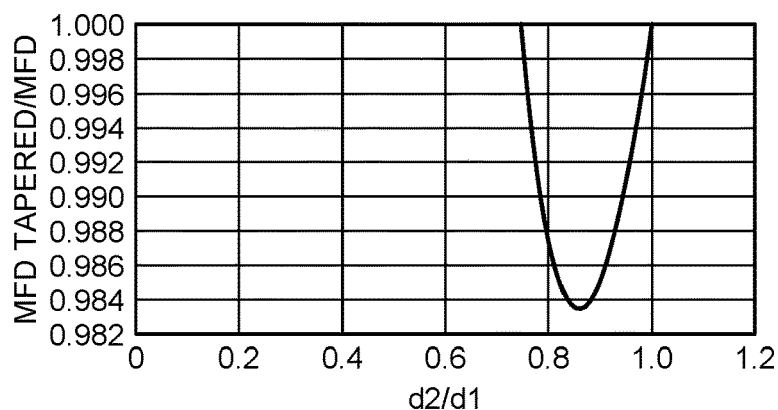
FIG. 9C is a diagram illustrating a simulation result of the single mode optical fiber.

FIG. 9A is a graph that represents a simulation result of a relationship between a mode field diameter (MFD) at a wavelength of 1550 nm and the diameter of the core portion 601 in a case where each of the single mode optical fibers 60a is drawn such that the cable cutoff wavelength is 1268 nm and is formed as a single-mode fiber having a unimodal refractive index profile in which a relative refractive-index difference Δ is 1%. Meanwhile, for convenience of explanation, the single mode optical fiber 60a with this configuration will be referred to as a fiber D. FIG. 9B is a graph that represents a relationship between the mode field diameter (MFD) and d2/d1 of the fiber D, and FIG. 9C is a graph that represents a relationship between the standardized mode field diameter (MFD) and d2/d1 of the fiber D. According to the graph in FIG. 9C, the standardized mode field diameter exceeds 1 when d2/d1 becomes equal to or smaller than 0.75, and therefore, as for the fiber D, it is preferable that 0.75<d2/d1<1. The core diameter is 5.1 µm and the mode field diameter is 6.1 µm when d2/d1=1, and the core diameter is 4.4 µm when d2/d1=0.75.

In summary, as for the relationship between the core portion 601 of the single mode optical fiber 60a located in the small-diameter portion 621 and d1 and d2, it is preferable that 0.57≤d2/d1<1 from the simulation result.

Figure 10:
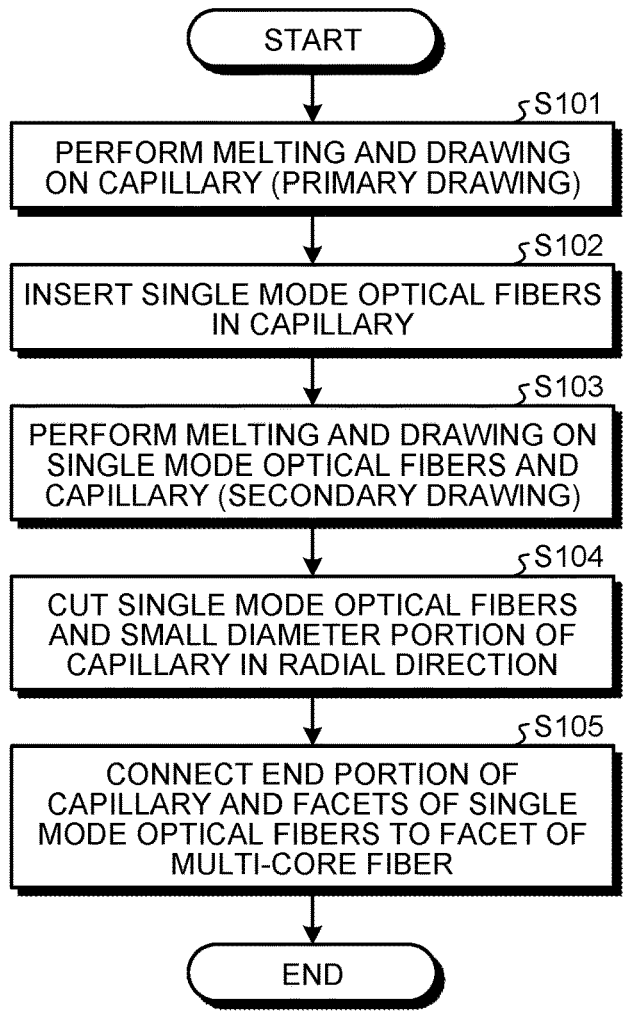
FIG. 10 is a flowchart of an optical fiber fan-out manufacturing method.

A method of manufacturing the optical fiber fan-out 60 will be described below. FIG. 10 is a flowchart of the method of manufacturing the optical fiber fan-out 60, and FIG. 11 to FIG. 15 are cross-sectional views of capillaries in the axial direction, which are used to manufacture the optical fiber fan-out 60 and the optical fiber fan-out 60 in the manufacturing process.

Figure 11:
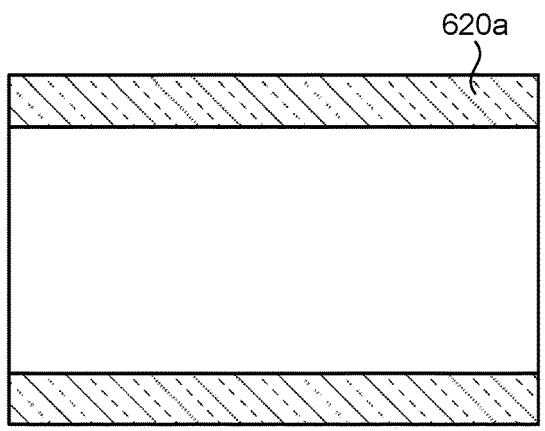
FIG. 11 is a cross-sectional view in an optical fiber fan-out manufacturing process.

FIG. 11 is a diagram illustrating the capillary 620 before being subjected to melting and drawing. A capillary 620a before being subjected to melting and drawing is formed in a cylindrical shape. An inner diameter of the capillary 620a is larger than three times of the outer diameter of the large-diameter portion 613 including the coated portion 603 of each of the single mode optical fibers 60a, and is set to, for example, 400 to 450 µm. It is preferable that an outer diameter of the capillary 620a is about 1.2 times larger than the inner diameter, and the outer diameter is set to, for example, 480 to 540 µm.

Figure 12:
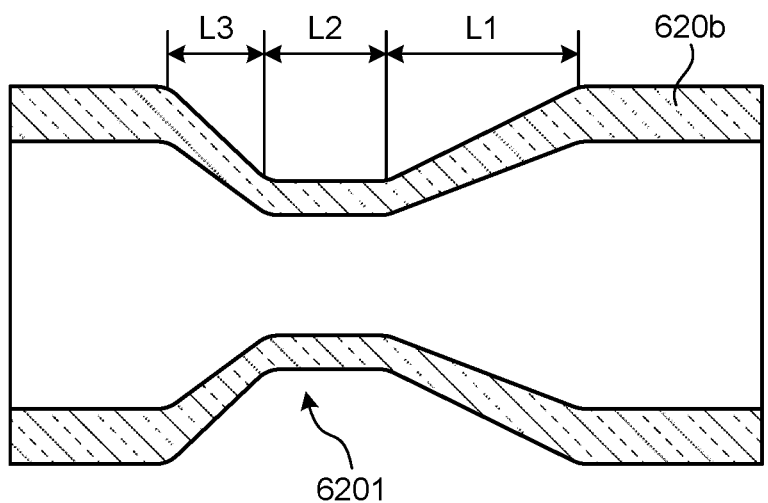
FIG. 12 is a cross-sectional view in the optical fiber fan-out manufacturing process.

As for manufacturing of the optical fiber fan-out 60, the capillary 620a is first subjected to melting and drawing (primary drawing) (Step S101), and a capillary 620b in which an inner diameter and an outer diameter are smaller than both ends as illustrated in FIG. 12 is formed.

Assuming that the outer diameter of the small-diameter portion 611 of each of the single mode optical fibers 60a is denoted by d µm, it is preferable that an inner diameter of a small-diameter portion 6201 with a reduced outer diameter and a reduced inner diameter in the capillary 620b that is formed by the primary drawing is 3d+1 to 8 µm. Further, it is preferable that a length L1 of a tapered portion at a side at which the single mode optical fibers 60a are inserted in the axial direction is 5 to 10 µm, and a length L2 of the small-diameter portion 6201 that is formed by the primary drawing in the axial direction is, for example, about 5 mm. The length of the tapered portion at a side opposite to the side at which the single mode optical fibers 60a are inserted in the axial direction is set to an appropriate length by taking into account consistency with an apparatus that is used in a subsequent process.

Figure 13:
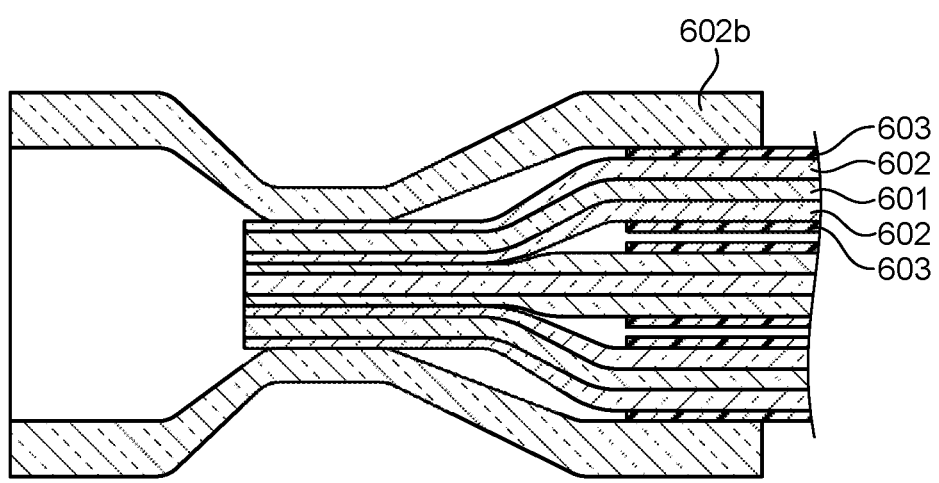
FIG. 13 is a cross-sectional view in the optical fiber fan-out manufacturing process.

Subsequently, the small-diameter portions 611 of the seven single mode optical fibers 60a are arranged in a triangular lattice manner and inserted in the small-diameter portion 6201 of the capillary 620b as illustrated in FIG. 13 (Step S102). Step S102 is one example of an insertion process.

Figure 14:
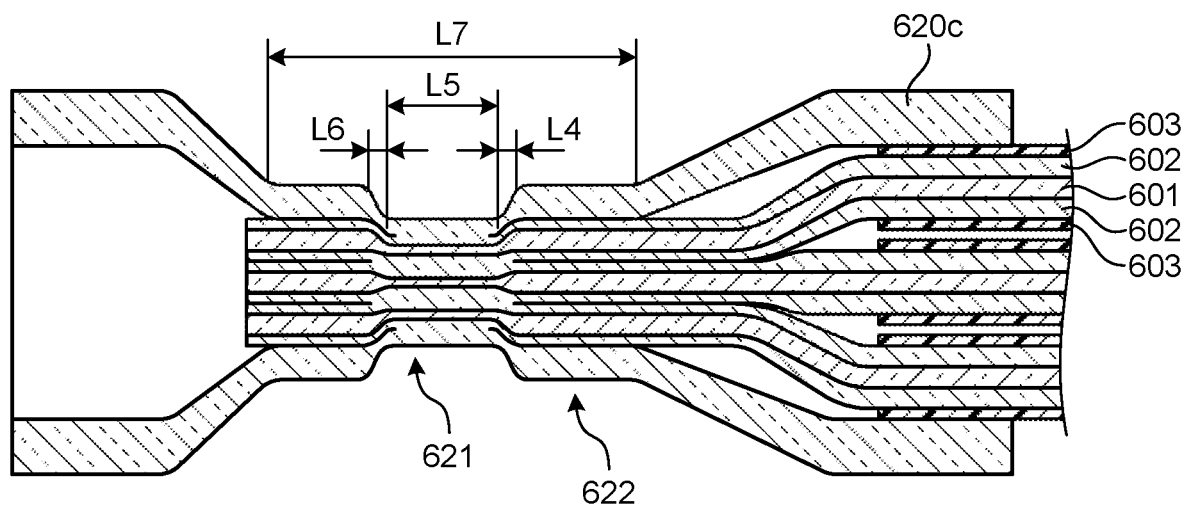
FIG. 14 is a cross-sectional view in the optical fiber fan-out manufacturing process.

Subsequently, the small-diameter portion 6201 of the capillary 620b and the small-diameter portions 611 of the seven single mode optical fibers 60a are subjected to melting and drawing (secondary drawing) (Step S103). Step S103 is one example of a melting drawing process. FIG. 14 is a diagram illustrating a capillary 620c that is formed by performing the secondary drawing on the capillary 620b and the small-diameter portions 611 of the single mode optical fibers 60a that are subjected to the secondary drawing. By the secondary drawing, the small-diameter portion 621 and the medium-diameter portion 622 are formed, and the capillary 620c and the small-diameter portions 611 of the cladding portions 602 are connected to each other by fusion bonding and the small-diameter portions 611 of the cladding portions 602 of the seven single mode optical fibers 60a are connected to each other by fusion bonding. In this manner, the capillary 620c and the cladding portions 602 are connected to each other by fusion bonding, and the small-diameter portions 611 of the cladding portions 602 are connected to each other by fusion bonding, so that it is possible to prevent a change in positions of the core portions 601 at a fusion bonding connection step as will be described later. Furthermore, an inner diameter of the small-diameter portion 621 that is formed by the secondary drawing is set to a certain value that is smaller than three times of the outer diameter of the small-diameter portion 611 of each of the single mode optical fibers 60a that are not subjected to the secondary drawing. It is preferable that a length L5 of the small-diameter portion 621 that is formed by the secondary drawing in the axial direction is set to, for example, about 5 mm.

When heat is applied in the secondary drawing, a change in the positions of the core portions 601 of the single mode optical fibers 60a arranged in a triangular lattice manner is prevented due to a balance between a surface tension from the capillary 620c and a surface tension of the small-diameter portions 611 of the cladding portions 602 of the single mode optical fibers 60a.

Figure 15:
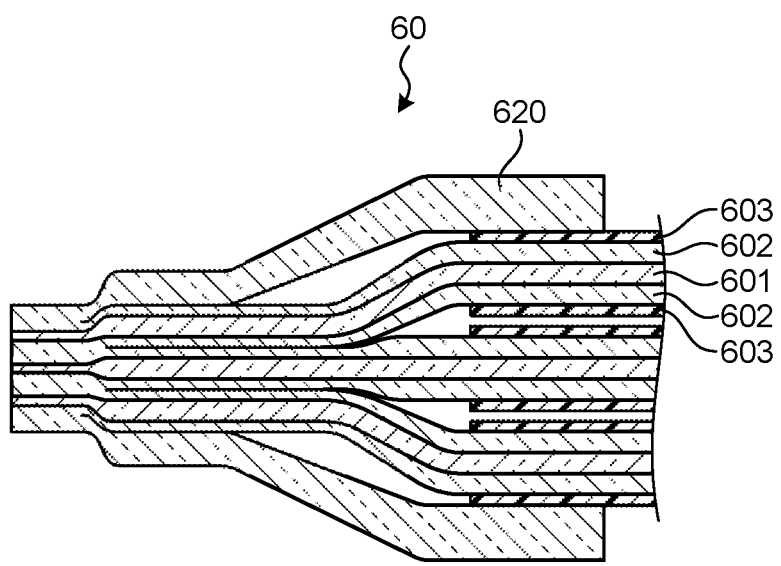
FIG. 15 is a cross-sectional view in the optical fiber fan-out manufacturing process.

Subsequently, to connect the multi-core fiber 60b, the small-diameter portion 621 of the capillary 620c and the single mode optical fibers 60a that are located in the small-diameter portion 621 are cut in a radial direction in a central portion of the small-diameter portion 621 in the axial direction in order to obtain flat facets as illustrated in FIG. 15, for example (Step S104). Step S104 is one example of a cutting process. A configuration before the multi-core fiber 60b is connected as illustrated in FIG. 15 is one example of an optical fiber bundle structure.

Subsequently, the facets of the cut small-diameter portion 621 of the capillary 620 and the cut single mode optical fibers 60a are connected to a facet of the multi-core fiber 60b by fusion bonding to form the optical fiber fan-out 60 as illustrated in FIG. 3 (Step S105).

In the optical amplifier 100, a fan-out with high light resistance, that is, a fan-out in which adhesive is not interposed in an optical path, is needed, and, according to the optical fiber fan-out 60 of the present embodiment, the multi-core fiber 60b and the single mode optical fibers 60a are connected to each other without using adhesive, so that it is possible to achieve high light resistance.

According to the optical fiber fan-out 60 of the present embodiment, the single mode optical fibers 60a and the multi-core fiber 60*b* are connected by connection between single mode cores, so that it is possible to prevent loss due to the connection.

Furthermore, according to the present embodiment, at a position at which the multi-core fiber 60*b* and the core portions 601 of the single mode optical fibers 60*a* are optically coupled with each other, a change in the positions of the core portions 601 in a triangular lattice manner is prevented and reduction of the outer diameters of the single mode optical fibers 60*a* is prevented at a side at which the multi-core fiber 60*b* is connected, so that it is possible to prevent the waveguide mode from becoming a leaky mode and prevent crosstalk.

Moreover, according to the present embodiment, the single mode optical fibers 60*a* are optical fibers in which the cladding portions 602 are subjected to etching, and the outer diameters of the core portions 601 in a portion other than a portion located in the small-diameter portion 621 is maintained constant, so that it is possible to align a pitch with the core portion 601 of the multi-core fiber 60*b* and prevent the waveguide mode from becoming a leaky mode.

The embodiment of the present disclosure has been described above, but the present disclosure is not limited to the embodiment as described above and may be embodied in various different forms. For example, the present disclosure may be embodied by modifying the above-described embodiment as described below. Meanwhile, the embodiment as described above and the modification as described below may be combined with each other. The present disclosure includes a configuration that is achieved by appropriately combining components of the embodiment as described above and the modifications. Further, additional advantages and modifications will readily occur to those skilled in the art. Therefore, the disclosure in its broader aspects is not limited to the embodiment and the modifications described above, and various modifications may be made.

In the embodiment as described above, the optical fiber fan-in 20 may be configured in the same manner as the optical fiber fan-out 60 and manufactured by the same manufacturing method as the optical fiber fan-out 60. Therefore, the optical fiber fan-in 20 may be one example of the optical fiber connection structure.

In the embodiment as described above, the number of the single mode optical fibers 60*a* included in the optical fiber fan-out 60 is not limited to seven, and may be, for example, 4 or 17.

In the embodiment as described above, it may be possible to provide sol-gel glass, inorganic adhesive, or water glass between the capillary 620 and the cladding portions 602.

In the embodiment as described above, the small-diameter portions 611 and the tapered portions 612 of the single mode optical fibers 60*a* are formed by etching, but may be formed by physical polishing or fire polishing.

In the embodiment as described above, the portions in which the coated portions 603 are removed and the cladding portions 602 are exposed in the single mode optical fibers 60*a* that are not yet inserted in the capillary 620*b* include the small-diameter portions 611 and the tapered portions 612, but the portions in which the cladding portions 602 are exposed may be configured such that the small-diameter portions 611 and the tapered portions 612 are not formed and the diameters of the cladding portions 602 are the same as the large-diameter portions 613. Furthermore, the portions in which the cladding portions 602 are exposed in the single mode optical fibers 60*a* that are not yet inserted in the capillary 620*b* may be configured such that the small-diameter portions 611 are not provided and the tapered portions 612 are formed so as to extend to a distal end.

In the embodiment as described above, the optical fiber fan-out 60 is used for the optical amplifier 100, but the optical fiber fan-out 60 need not always be used for the optical amplifier 100, but may be applied to an application, such as a CATV or a sensing device, that is operated with high optical power.

According to the present disclosure, it is possible to provide an optical fiber bundle structure, an optical fiber connection structure, and an optical fiber bundle structure manufacturing method capable of preventing crosstalk.

Although the disclosure has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber bundle structure comprising:
   a plurality of optical fiber core wires; and
   a capillary, wherein
   each of the optical fiber core wires includes
      a glass fiber portion including a core and a clad, and
      a resin coated portion,
   the glass fiber portions are inserted in the capillary, and
   d2/d1 is equal to or larger than 0.57 and smaller than 1,
      where d1 is a diameter of the core of each of the glass fiber portions in a rear end portion of the capillary and d2 is a diameter of the core of each of the glass fiber portions in a distal end portion of the capillary,
   wherein the capillary has a hollow shape and includes a large-diameter portion, a tapered portion, and a small-diameter portion, and
   wherein $t \leq 3.1\ \Lambda$, where t is a thickness of the small-diameter portion of the capillary, and $\Lambda$ is a distance between the cores of the plurality of optical fiber core wires located in the small-diameter portion.

2. The optical fiber bundle structure according to claim 1, wherein each of the optical fiber core wires has a unimodal refractive index profile in which a relative refractive-index difference of the core with respect to the clad is set such that light in a predetermined wavelength band propagates in a single mode.

3. The optical fiber bundle structure according to claim 1, wherein each of the optical fiber core wires propagates light with a wavelength of 950 nm or more in a single mode.

4. The optical fiber bundle structure according to claim 1, wherein each of the optical fiber core wires propagates light with a wavelength of 1260 nm or more in a single mode.

5. The optical fiber bundle structure according to claim 1, wherein one of sol-gel glass, inorganic adhesive, and water glass is filled between an inner wall of the capillary and the clad of each of the optical fiber core wires.

6. The optical fiber bundle structure according to claim 1, wherein, in the small-diameter portion, at least the clads of the plurality of optical fiber core wires or the clads of the optical fiber core wires and a part of an inner wall of the capillary are connected to each other by fusion bonding.

7. The optical fiber bundle structure according to claim 1, wherein a diameter of each of the clads located in the small-diameter portion is smaller than a diameter of each of the clads located in the large-diameter portion.

8. The optical fiber bundle structure according to claim 1, wherein each of the clads includes a diameter-reduced portion in which a diameter is reduced toward a distal end side, and the diameter-reduced portion is located inside the tapered portion.

9. The optical fiber bundle structure according to claim 1, wherein the number of the cores is four, and $t \leq 2.0\Lambda$.

10. The optical fiber bundle structure according to claim 1, wherein the number of the cores is seven, and $t \leq 2.5\Lambda$.

11. The optical fiber bundle structure according to claim 1, wherein the number of the cores is 19, and $t \leq 3.1\Lambda$.

12. An optical fiber connection structure comprising:

the optical fiber bundle structure according to claim 1; and a multi-core fiber including:
- a plurality of core portions that are connected to the cores of the plurality of optical fiber core wires; and
- cladding portions that are formed on outer peripheries of the core portions.

13. An optical fiber bundle structure manufacturing method comprising:

inserting a glass fiber portion of an optical fiber core wire into a capillary, the optical fiber core wire including the glass fiber portion including a core and a clad and a resin coated portion;

melting and drawing the capillary and the glass fiber portion inserted in the capillary such that d2/d1 is equal to or larger than 0.57 and smaller than 1, where d1 is a diameter of the core of the glass fiber portion in a rear end portion of the capillary and d2 is a diameter of the core of the glass fiber portion in a distal end portion of the capillary; and cutting a portion that is drawn by the melting and drawing such that a cross section crossing an axial direction of the capillary is exposed, wherein the capillary has a hollow shape and includes a large-diameter portion, a tapered portion, and a small-diameter portion, and wherein $t \leq 3.1\Lambda$, where t is a thickness of the small-diameter portion of the capillary, and $\Lambda$ is a distance between the cores of the plurality of optical fiber core wires located in the small-diameter portion.

* * * * *